Figure 1:
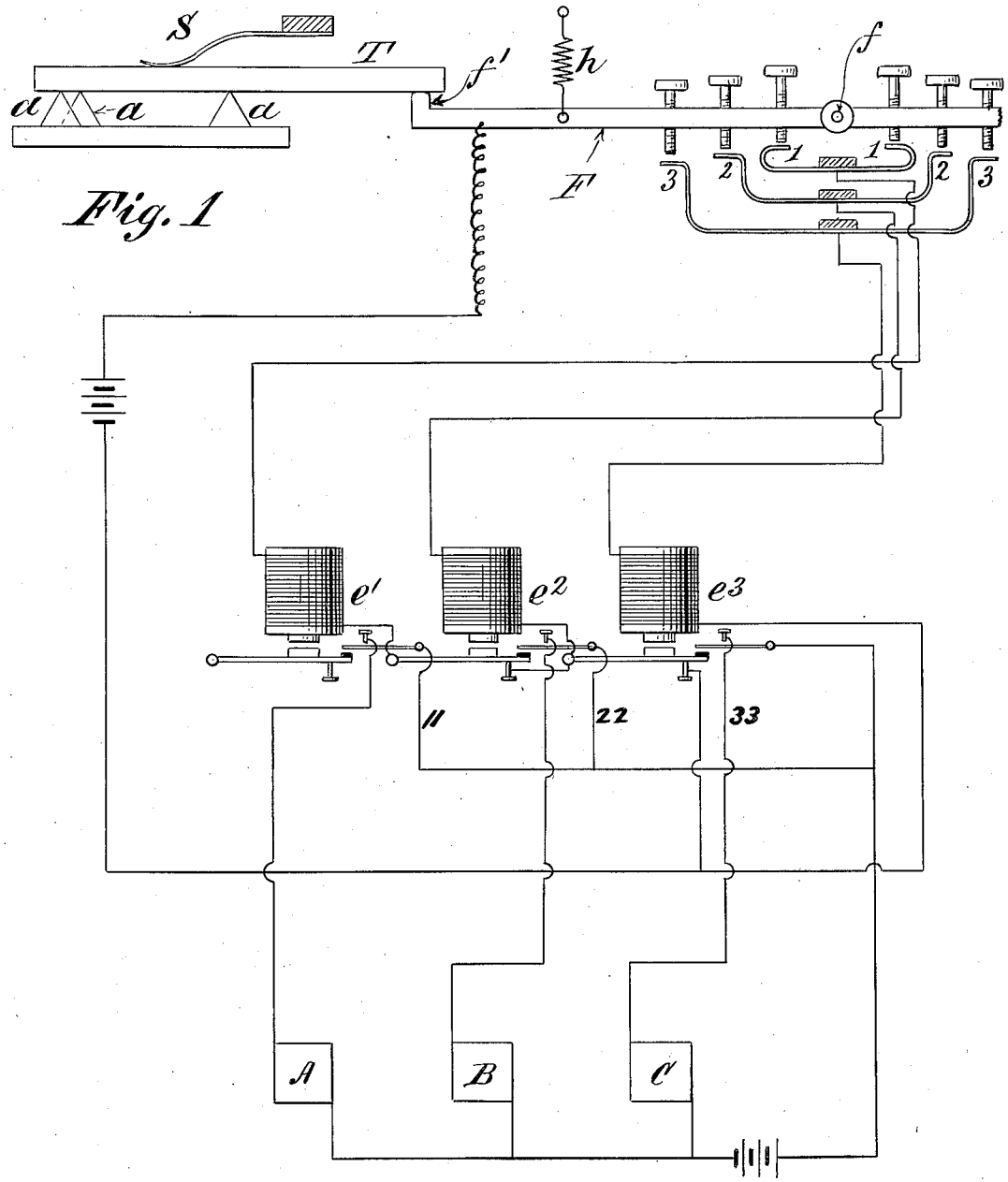

W. B. UPDEGRAFF.
MEANS FOR DETECTING AND INDICATING TILE WARPAGE.
APPLICATION FILED DEC. 15, 1910.

992,460.

Patented May 16, 1911.

2 SHEETS—SHEET 1.

W. B. UPDEGRAFF.
MEANS FOR DETECTING AND INDICATING TILE WARPAGE.
APPLICATION FILED DEC. 15, 1910.
992,460.
Patented May 16, 1911.
2 SHEETS—SHEET 2.
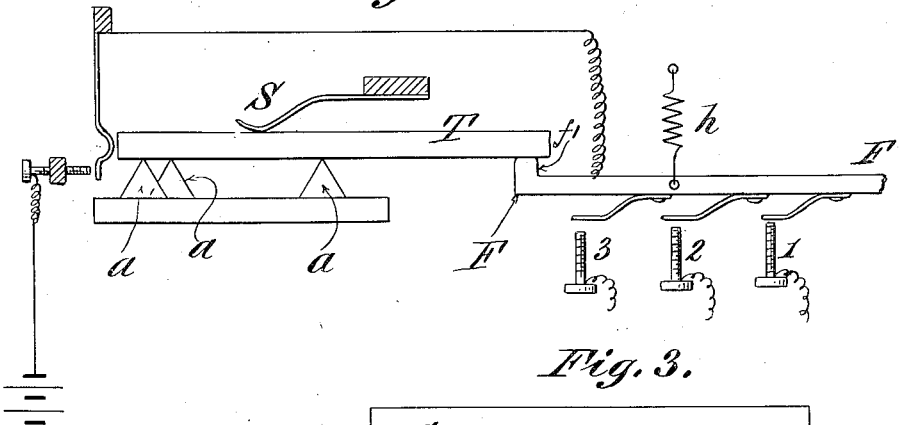
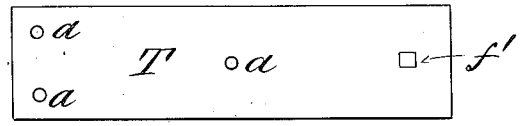
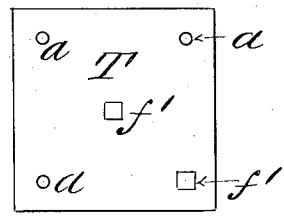
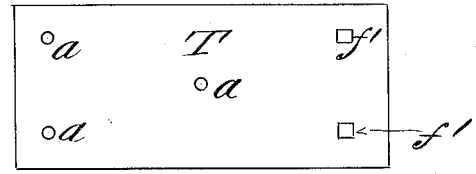
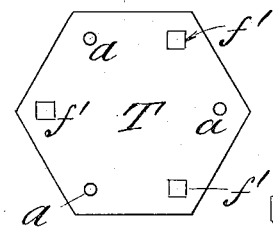
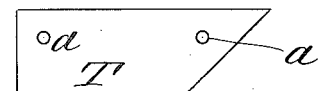
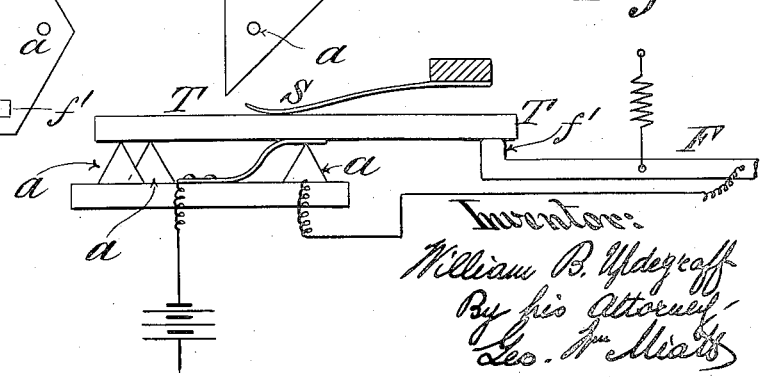

UNITED STATES PATENT OFFICE.

WILLIAM B. UPDEGRAFF, OF NEW YORK, N. Y.

MEANS FOR DETECTING AND INDICATING TILE-WARPAGE.

992,460.

Specification of Letters Patent. Patented May 16, 1911.

Application filed December 15, 1910. Serial No. 597,420.

*To all whom it may concern:*

Be it known that I, WILLIAM B. UPDE-GRAFF, a citizen of the United States, residing in the borough of Manhattan, city, county, and State of New York, have invented certain new and useful Improvements in Means for Detecting and Indicating Tile-Warpage, of which the following is a specification.

It is well known that many tiles are distorted or "warped" more or less in process of manufacture, particularly during "firing"; also that such deformities are frequently sufficient to render certain tiles useless for all practical purposes. Furthermore the testing of tiles to ascertain warpage has heretofore been done manually only, by means relatively crude, slow and unreliable by reason of inaccuracy and lack of uniformity of treatment.

It is the object of my invention not only to positively detect the warpage of tiles with accuracy but also to provide for the sorting thereof into grades indicating the relative degree of deflection from perfect form. To this end a perfectly true support for the tile while it is being subjected to the action of a feeler or feelers is absolutely essential, and this I have attained by the use of a tripartite seat consisting of three fixed, rigid contact points triangularly positioned with relation to each other against which the tile to be measured is held while being tested. If the tile is true and perfect its broad sides will obviously extend in planes, one, the side resting against the said three contacts, being in the same plane therewith, and the other broad side extending parallel thereto. In the case of a warped or distorted tile it is equally obvious it will deviate more or less from parallelism with the true plane of the three triangularly positioned contacts and will incline laterally in one or more directions, and these deviations I detect and report by the use of one or more feelers actuating an electric circuit closer or closers controlling electrically actuated indicating means substantially as hereinafter set forth.

In the accompanying drawings, Figure 1, represents more or less diagrammatically the essential features of my invention and the practical application of my system of detecting tile warpage. Fig. 2, shows a slight modification relating to the closing of the main electric circuit, &c. Figs. 3, to 7 inclusive indicate diagrammatically methods of feeling and testing tiles of different shapes, the triple contact seats being indicated by circles, and the feeler contacts by squares. Fig. 8, illustrates diagrammatically another modification relating to the closing of the main circuit.

The tile T, to be tested is seated on the three stationary rigid contacts $a, a, a,$ by any suitable or convenient means, either manually or otherwise, as may be found most expedient according to circumstances and conditions of use. It is held seated against said contacts $a, a, a,$ by a spring S, or equivalent mechanical expedient; and the said seat contacts are spaced apart and triangularly positioned with relation to each other and to the size and shape of the tile to be subjected to test in such manner as to afford ample support while contacting with the tile at points most appropriate for detecting inequalities of surface. Thus if the surface of the tile contacted with is either convex or concave in whole or in part the seating of the tile on the three rigid triangularly positioned contacts $a, a, a,$ will necessarily cause portions of the tile to be tilted or inclined more or less laterally or longitudinally, or both,—only the true or perfect tile being in exact parallelism with the plane of the said seat contacts. The tile thus supported on the triangular tripartite seat is subjected to the action of one or more feelers F, only one being shown in detail in the drawings because when a plural number is used they may be duplicates of each other. Each feeler F, is pivotally supported, as at $f$, and tends constantly to thrust its finger $f'$, against a broad side of the seated tile by reason of the action of a helical spring $h$, or equivalent tension device. The feeler shown is a rock lever, although this is not an essential feature, since any mechanical expedient may be resorted to which will be adapted to feel a broad side of a tripartitely seated tile and cause electrical contact consecutively with a series of electric terminals, as for instance 1, 2, 3. Thus in Fig. 1, the said terminals 1, 2, 3, are elastic and resilient so as to yield successively to the contacts on the feeler F, whereas in Fig. 2, the feeler F, itself carries elastic resilient contacts which yield successively to fixed terminal contacts 1, 2, 3.

In Fig. 1, the contacts on the feeler F, and the terminals 1, 2, 3, are duplicated on either side of the fulcrum $f$, so as to measure and indicate deflections of tile surface in either direction beyond the surface extension of a normal or perfect tile. That is to say, in the arrangement shown therein, the parts are in the neutral position, in which the contacts carried by the feeler are not in engagement with any of the terminals 1, 2, 3,—the tile upon the tripartite seat being perfect. Any deviation however from the perfect normal tile will cause the feeler F, to rock in one direction or the other, according to the direction of deflection or warpage, and thereby effect contact with one or more of the electric terminals 1, 2, 3. As a result, the degree of variation from the perfect or normal tile is indicated through the medium of the electric apparatus used.

The combined electric feeler and circuit closer F, may be in permanent electrical connection as shown in Fig. 1, or may be thrown into electrical connection by the seated tile as shown in Figs. 2 and 8. It is also obvious that the feeler F, may be arranged to act in conjunction with and control any suitable or well known circuit closing device with like result.

As before intimated any desired number of feelers may be arranged to contact with the seated tile simultaneously, and to actuate circuit closers controlling primary circuits, the latter in turn controlling electrically actuated indicating means, according to the size, shape and requirements of the tile to be inspected and classified. Thus as indicated in Figs. 3 to 7 inclusive, in which the circles $a$, $a$, $a$, represent the points of contact with the triangular tripartite tile seat, and the squares $f$, the feeler fingers, one or various parts of a broad side of the body of a tile may be felt simultaneously, the tripartite support afforded the tile under all circumstances insuring the detection and report of any deflection or inequality of surface.

Interposed in each primary circuit is an electric device $e'$, $e^2$, $e^3$, for indicating a measurement, either directly or indirectly, as may be found most expedient. Thus instead of the electric magnets shown ($e'$, $e^2$, $e^3$,) other electric indicators may be substituted; or the electro-magnets may be utilized to close secondary circuits 11, 22, 33, in which are interposed electric indicating appliances A, B, C, of any desired character.

In the arrangement of primary and secondary circuits shown in Fig. 1, the contact representing the maximum deflection made by the feeler and circuit closer will control as affording the line of least resistance, the contacts representing a lesser degree of distortion being cut out by open circuit. In this connection it may be stated that any desired number or sub-division of tests and indications between minimum and maximum degrees of warpage may be provided for, the three shown in the drawings being by way of illustrating the principle only.

In Letters Patent No. 980,851, I describe and claim a somewhat similar method of measuring and indicating variations in the length of tile. I herein expressly disclaim the means therein set forth for feeling the edges of tile, my present invention relating entirely to the detection and indication of tile warpage, in which the tripartite tile seat performs an important function. In this connection it is to be understood that a distinguishing feature of my present invention consists in seating the tile to be tested on three stationary rigid contact points triangularly arranged with relation to each other, so as to attain a single, perfect positive plane of support under all circumstances and conditions.

What I claim herein as my invention and desire to secure by Letters Patent is,

1. Means for detecting and indicating tile warpage, comprising a rest for the body of the tile consisting of three contacts only, a plurality of feelers arranged to contact with the body of the tile, electric circuit closers actuated by said feelers, a plurality of primary electric circuits controlled by each of said circuit closers, an electro-magnetic switch in each of said primary circuits, secondary electric circuits controlled by said electro-magnetic switches, and electrically actuated indicating means controlled by said secondary circuits, for the purpose set forth.

2. Means for detecting and indicating tile warpage, comprising a rest for the body of the tile consisting of three contacts only, a plurality of feelers arranged to contact with the body of the tile, electric circuit closers actuated by said feelers, a plurality of electric circuits controlled by each of said circuit closers, each of said electric circuits having a terminal arranged to contact with its circuit closer at a point different from the others and corresponding to a prescribed degree of tile warpage, and electrically actuated indicating means controlled by said electric circuits for the purpose set forth.

3. Means for detecting and indicating tile warpage, comprising a tripartite seat for the body of a tile, a combined feeler and circuit closer arranged to contact with a broad side of the body of the seated tile, said combined feeler and circuit closer consisting of a rock lever formed with duplicate electrical contacts, duplicate electric terminals so positioned with relation to the said duplicate contacts on the combined feeler and circuit closer as to engage successively therewith, electric circuits connected with said duplicate terminals and controlled by said combined feeler and circuit closer, and electrically actuated indicating means controlled by said circuit, whereby lateral deflections of tile surface in either direction are indicated substantially in the manner and for the purpose set forth.

4. Means for detecting and indicating tile warpage, comprising a seat for the body of the tile consisting of three fixed rigid contacts triangularly positioned with relation to each other, a feeler arranged to contact with the face of the tile thus seated on said three fixed rigid triangularly positioned supporting contacts, an electric circuit closer actuated by said feeler, an electric circuit controlled by said circuit closer, and electrically actuated indicating means controlled by said circuit for the purpose described.

5. Means for detecting and indicating tile warpage, comprising a seat for the body of the tile consisting of three fixed rigid contacts triangularly positioned with relation to each other, a feeler arranged to contact with the face of the tile so seated on said three fixed rigid triangularly positioned supporting contacts, an electric circuit closer actuated by said feeler, a primary electric circuit controlled by said circuit closer, an electro-magnetic switch in said primary circuit closer, a secondary electric circuit controlled by said electro-magnetic switch, and an electrical indicating device interposed in said secondary circuit, for the purpose described.

6. Means for detecting and indicating tile warpage, comprising a seat for the body of the tile consisting of three fixed rigid contacts triangularly positioned with relation to each other, a feeler arranged to contact with the face of the tile thus seated on said three fixed rigid triangularly positioned supporting contacts, an electric circuit closer actuated by said feeler, a plurality of electric circuits controlled by said circuit closer each having a terminal arranged to contact with the circuit closer at a point different from the others and corresponding to a prescribed degree of warpage of the tile, and electrically actuated indicating means controlled by said electric circuits, for the purpose set forth.

7. Means for detecting and indicating tile warpage, comprising a seat for the body of the tile consisting of three fixed rigid contacts triangularly positioned with relation to each other, a feeler arranged to contact with the face of the tile thus seated on said three fixed rigid triangularly positioned supporting contacts, an electric circuit closer actuated by said feeler, a plurality of primary electric circuits controlled by said feeler and circuit closer, an electro-magnetic switch in each of said primary circuits, secondary electric circuits controlled by said electro-magnetic switches, and electrically actuated indicating means controlled by said secondary circuits for the purpose described.

WILLIAM B. UPDEGRAFF.

Witnesses:
Geo. Wm. Miatt,
Lillia Miatt.